(12) United States Patent
Sarraf et al.

(10) Patent No.: US 7,925,208 B2
(45) Date of Patent: *Apr. 12, 2011

(54) MULTI-SPOT-BEAM SATELLITE SYSTEM WITH BROADCAST AND SURGE CAPACITY CAPABILITY

(75) Inventors: Jamal Sarraf, Irvine, CA (US); Edward J. Fitzpatrick, Rancho Palos Verdes, CA (US); James E. Justiss, Rancho Palos Verdes, CA (US); Remberto Martin, Walnut, CA (US); Michelle J. Glaser-Weiner, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2076 days.

This patent is subject to a terminal disclaimer.

(21) Appl. No.: 10/695,723

(22) Filed: Oct. 28, 2003

(65) Prior Publication Data

US 2004/0092227 A1    May 13, 2004

Related U.S. Application Data

(60) Division of application No. 09/605,775, filed on Jun. 28, 2000, now Pat. No. 6,704,544, which is a continuation of application No. 08/882,119, filed on Jun. 25, 1997, now Pat. No. 6,175,719.

(51) Int. Cl.
*H04B 7/185* (2006.01)
(52) U.S. Cl. .......... 455/12.1; 455/13.1; 455/17; 455/22; 370/319; 370/352; 370/353
(58) Field of Classification Search .................. 455/12.1, 455/13.1, 17, 22, 427–429; 370/319, 352, 370/353
See application file for complete search history.

(56) References Cited

U.S. PATENT DOCUMENTS

| | | |
|---|---|---|
| 4,181,886 A | 1/1980 | Cooperman |
| 4,188,578 A | 2/1980 | Reudink et al. |
| 4,381,562 A | 4/1983 | Acampora |
| 4,425,639 A * | 1/1984 | Acampora et al. ............ 370/323 |
| 4,722,083 A | 1/1988 | Tirro et al. |
| 4,831,619 A * | 5/1989 | Rosen ............................ 370/325 |
| 4,901,085 A | 2/1990 | Spring et al. |
| 5,012,254 A | 4/1991 | Thompson |
| 5,428,814 A | 6/1995 | Mort et al. |
| 5,473,601 A | 12/1995 | Rosen et al. |
| 5,625,624 A | 4/1997 | Rosen et al. |
| 5,631,898 A | 5/1997 | Dent |
| 5,644,572 A | 7/1997 | Olds et al. |
| 5,771,449 A | 6/1998 | Blasing et al. |
| 5,790,939 A | 8/1998 | Malcolm et al. |
| 5,825,325 A | 10/1998 | O'Donovan et al. |
| 5,966,371 A | 10/1999 | Sherman |
| 6,005,855 A * | 12/1999 | Zehavi et al. .................. 370/335 |
| 6,021,309 A * | 2/2000 | Sherman et al. .............. 455/12.1 |
| 6,032,041 A | 2/2000 | Wainfan et al. |

(Continued)

*Primary Examiner* — Tuan H. Nguyen

(57) ABSTRACT

A payload design for a multi-spot-beam satellite communication system includes a plurality of uplink spot beam receivers and downlink spot beam transmitters, and a broadcast transmitting subsystem capable of transmitting a broadcast beam to an entire system geographical service area. An input filter-switch-matrix (IFSM) controllably selects input IF signal bands for routing to an on-board digital signal processor-router (DSPR). The DSPR subsequently routes all received point-to-point and broadcast data packets to the appropriate downlink spot or broadcast transmitting subsystems for transmission thereof. The broadcast downlink allows broadcast transmissions to occur at the highest efficiency possible, while also allowing for flexible provision of surge capacity for point-to-point transmissions on previously exhausted spot beams by selective use of the broadcast beam for such point-to-point transmissions.

5 Claims, 3 Drawing Sheets

U.S. PATENT DOCUMENTS

| | | | |
|---|---|---|---|
| 6,104,911 A * | 8/2000 | Diekelman | 455/13.1 |
| 6,160,993 A | 12/2000 | Wilson | |
| 6,175,719 B1 | 1/2001 | Sarraf et al. | |
| 6,195,555 B1 * | 2/2001 | Dent | 455/456.2 |
| 6,201,961 B1 | 3/2001 | Schindall et al. | |
| 6,272,317 B1 | 8/2001 | Houston et al. | |
| 6,301,232 B1 * | 10/2001 | Dutta | 370/321 |
| 6,317,583 B1 | 11/2001 | Wolcott et al. | |
| 6,339,707 B1 | 1/2002 | Wainfan et al. | |
| 6,542,716 B1 * | 4/2003 | Dent et al. | 455/13.1 |
| 6,594,469 B1 | 7/2003 | Serri et al. | |

* cited by examiner

MULTI-SPOT-BEAM SATELLITE SYSTEM WITH BROADCAST AND SURGE CAPACITY CAPABILITY

CROSS-REFERENCE TO RELATED APPLICATIONS

This is a divisional of application Ser. No. 09/605,775, filed Jun. 28, 2000 now U.S. Pat No. 6,704,544 which was a continuation of application Ser. No. 08/882,119 filed Jun. 25, 1997, now issued as U.S. Pat. No. 6,175,719 on Jan. 16, 2001, the entire contents of both applications being incorporated herein by this reference.

TECHNICAL FIELD

The present invention relates to multi-spot-beam satellite communication systems, and more particularly to a satellite payload arranged to provide broadcast and surge-capacity capability to multi-spot-beam satellite communication systems.

BACKGROUND ART

Generally, an emerging use of wide-band communication systems employing extremely high frequency Ka or V frequency bands is leading to development and implementation of commercial satellite systems which support a large number of high-gain spot beams. Because of high reuse of the available frequency spectrum, spot beam technology advantageously allows high capacity systems to be realized with a finite number of beams. For example, the primary frequency spectrum of the orbit slot is typically divided up equally among several spot beams to form a frequency reuse cluster, e.g., four beams per cluster. Spot beam technology also permits reduction of ground terminal size to a point where such terminals become commercially feasible as a mass-market end-user terminal.

In known payload designs for multi-beam systems, total capacity of the satellite is generally divided and allocated among the beams on a preferably equal basis so as to accommodate design simplification and cost reductions as well as changes in user demand and market needs. As a result, such payloads achieve maximum total throughput only when used in support of point-to-point (PTP) transmissions having an even traffic distribution among the respective beams at their individual full capacities. However, such even distribution is inherently unrealistic because certain geographic areas naturally have a higher use demand than others. In addition, changing market conditions and other networking factors directly impact the distribution of a system's traffic load. Thus, known multi-beam systems operate with a significantly reduced effective utilization of the satellite capacity when compared to the capacity with which the beams could otherwise collectively support.

Another drawback to known multi-beam systems and payload designs which are inherently suited for PTP transmissions is the loss of throughput efficiency when such systems are used to support broadcast transmissions to be sent to the entire geographic service area. Typically, such systems can only provide broadcast capability if the desired broadcast information is individually transmitted on every spot beam in the system.

DISCLOSURE OF THE INVENTION

Therefore, it is an object of the present invention to provide a multi-spot-beam satellite communication system and method having improved utilization of system capacity.

Another object of the present invention to provide a payload design for a multi-spot-beam satellite communication system which can support both point-to-point and broadcast transmissions at an optimum transmission efficiency.

Still another object of the present invention to provide a payload design for a multi-spot-beam satellite communication system which can flexibly utilize up to all of a system's broadcast capacity as a surge mechanism to support point-to-point traffic for either uplink or downlink transmissions for any spot beam whose capacity has been exhausted.

In accordance with these and other objects, a first aspect of the present invention provides a method of configuring a satellite payload for use in a multi-spot-beam communication system including the steps of providing a plurality of spot-beam uplinks each of which receive signals transmitted from a particular section of a total geographic area to be serviced by the communication system, providing a plurality of spot-beam downlinks each of which transmits signals to a particular section of the total service area, and providing a broadcast downlink which transmits a single wide-area beam to the total service area. Point-to-point services are supported by routing point-to-point transmissions received by the plurality of uplinks to a particular one of the plurality of downlinks, while broadcast services are supported by routing broadcast transmissions received by the plurality of uplinks to the broadcast transmission link in a non-blocking manner. In addition, the method further can include the step of providing a surge mechanism by routing to the broadcast downlink point-to-point transmissions of any of the plurality of spot-beam uplinks and spot-beam downlinks whose transmission capacity is exhausted.

In accordance with another aspect of the present invention, a payload for use with a multi-spot-beam communication system includes a plurality of receiving spot-beam antenna subsystems each arranged to receive signals transmitted from a particular section of a total geographic area to be covered by the communication system, a receiver means connected to the plurality of receiving spot-beam antenna subsystems for converting each received signal to an intermediate frequency, and a plurality of transmitting spot-beam antenna subsystems each arranged to transmit signals to a particular section of the total service area. An on-board processor is connected to the receiver means and the plurality of transmitting spot-beam antenna subsystems for selectively routing received signals to a particular transmitting spot-beam antenna subsystem. A broadcast transmitter subsystem is connected to the on-board processor and arranged to transmit signals to the total service area, while an input-filter-switch-matrix is connected to the receiver means and the onboard processor for selectively routing bands of received signals to the on-board processor in a non-blocking manner for transmission by the broadcast transmitter subsystem.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
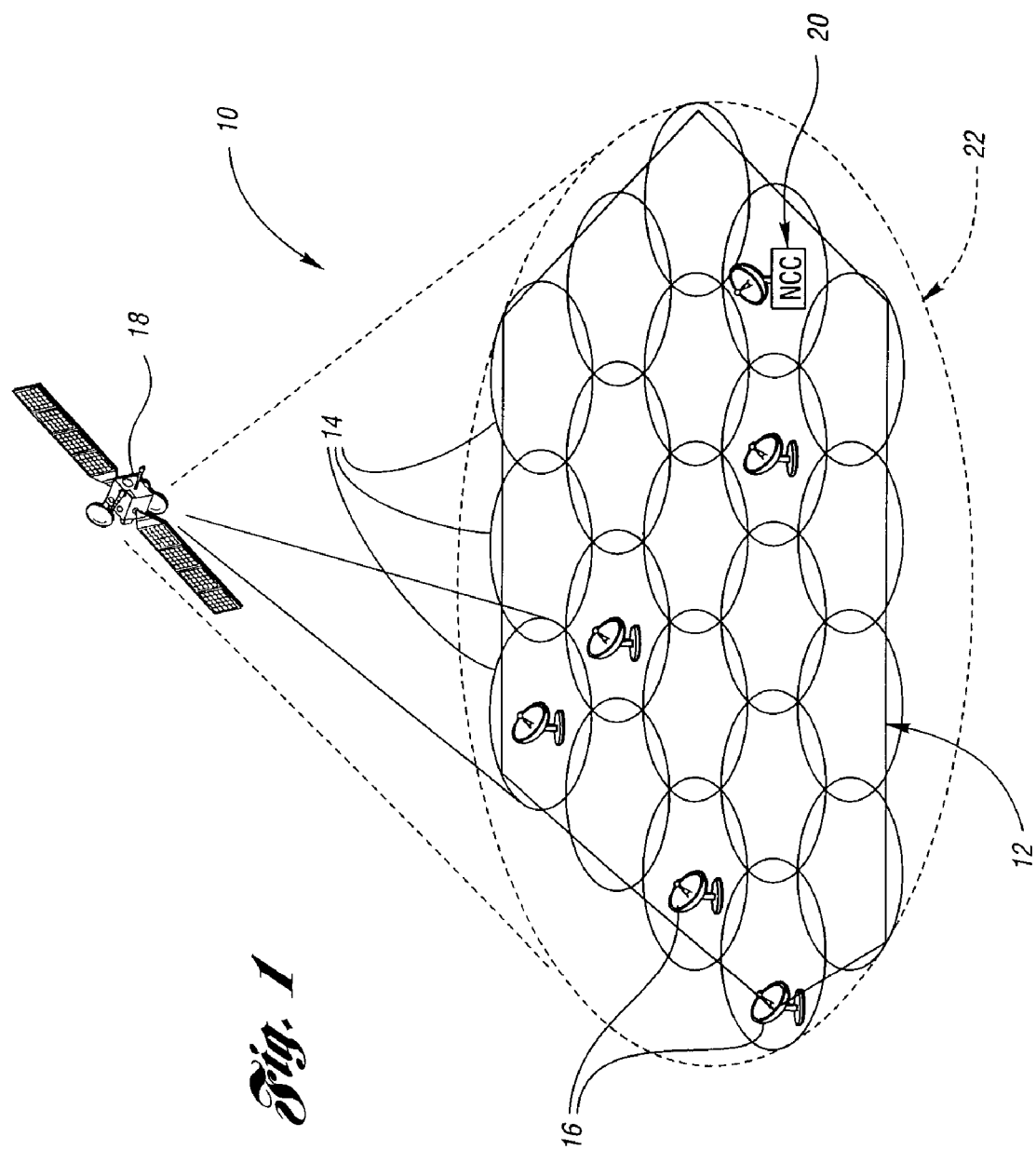
FIG. 1 shows the foot-print and layout of a multi-spot-beam satellite communication system in accordance with the present invention.

Referring to FIG. 1, a multi-spot-beam satellite communication system 10 is shown having a total service geographic area 12 covered by a relatively large number of uplink and downlink spot beams having individual foot-prints 14. High-gain uplink spot beams are preferably utilized to support small low-power, low cost, end-user earth station terminals 16, while high-gain downlink spot beams are utilized to support high-data-rate transmission to the same small end-user terminals 16. More importantly, the combination of uplink and downlink spot beams provides for multiple reuse of the same limited frequency spectrum by a single large satellite 18, thus creating a high-capacity system which can serve mass markets for numerous communications services. A network control center (NCC) 20 provides overall transmission control and uplink/downlink frequency assignment for end users 16 and satellite 18.

Figure 2:
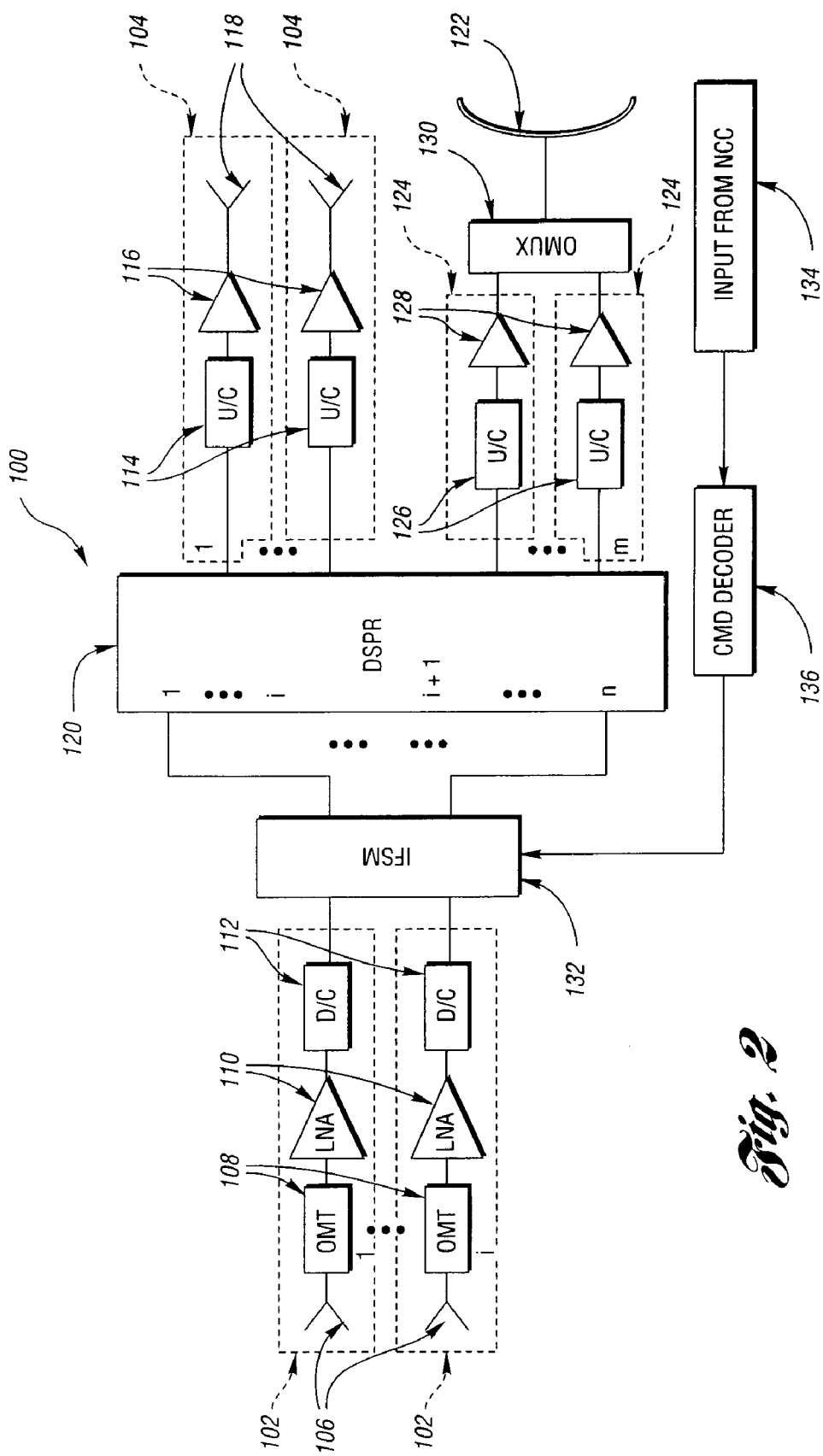
FIG. 2 shows a block diagram of a satellite payload in accordance with the present invention.

In accordance with the present invention, an area-wide broadcast downlink beam 22 is integrated into a satellite payload system design 100 as shown in FIG. 2. System 100 includes a plurality (i) of conventional uplink receiver subsystems 102 and a corresponding number of conventional downlink transmitter amplifier subsystems 104. The number of subsystems 102 and 104 can be any number selected for the system based on its design, intended use, cost, and the like. Each uplink receiver subsystem 102 includes a spot beam antenna 106, an orthogonal mode transducer (OMT) 108 (which separates signals of opposite polarizations), and a combination of a low noise amplifier (LNA) 110, and a down-converter (D/C) 112. While only one combination LNA/UC is shown for each uplink receive subsystem 102, a combination LNA/UC is provided for each of the two signal polarizations received by antenna 102 and 108. For point-to-point (PTP) traffic, each downlink transmit subsystem 104 includes an upconverter (U/C) 114, an amplifier 116, and a spot beam antenna 118. The operation and design of subsystems 102 and 104 is well understood in the art.

An on-board digital signal processor-router (DSPR) 120 preferably provides appropriate demodulation, routing/switching, multiplexing, and modulation of traffic data packets received by satellite 18 into time-division-multiplexed (TDM) signals. More specifically, all PTP transmissions (which are sent in the form of data packets) originating from a particular spot or footprint are received by a corresponding one of the antennas 106 and receiver subsystems 102 and converted to an intermediate frequency (IF) signal. DSPR 120 then processes and groups the data packets into individual signals for delivery via an output port to a particular one of the transmitter amplifier subsystems 104 and antennas 118 for subsequent transmission to the designated or addressed spot area.

In addition to subsystems 104 and corresponding antennas 118, system 100 includes a broadcast downlink antenna 122, an output-filter multiplexer (OMUX) 130, and a number of broadcast transmitter amplifier subsystems 124 connected to a plurality of DSPR 120 output ports. Broadcast antenna 122 transmits broadcast beam 22 so that all individual users in every spot area within service area 12 can receive the broadcast transmissions. Each broadcast transmitter amplifier subsystem 124 includes a set of upconverters (U/C) 126 and amplifiers 128 similar to upconverters 114 and amplifiers 116. OMUX 130 supplies the plurality of broadcast signals to broadcast antenna 122.

In further accordance with the present invention, each receiver subsystem 102 is preferably designed to receive the entire primary frequency bandwidth of system 10. This contrasts with known spot-beam receiver subsystems which typically only receive a fixed, individual sub-band. A reconfigurable input filter-switch-matrix (IFSM) 132 is connected to the plurality of receiver subsystems 102 and the DSPR 120 and is controllable via an NCC input 134 and a command decoder 136 to select any predefined band of each IF frequency spectrum, and connect the selected bands to appropriate output ports in a non-blocking fashion.

Figure 3:
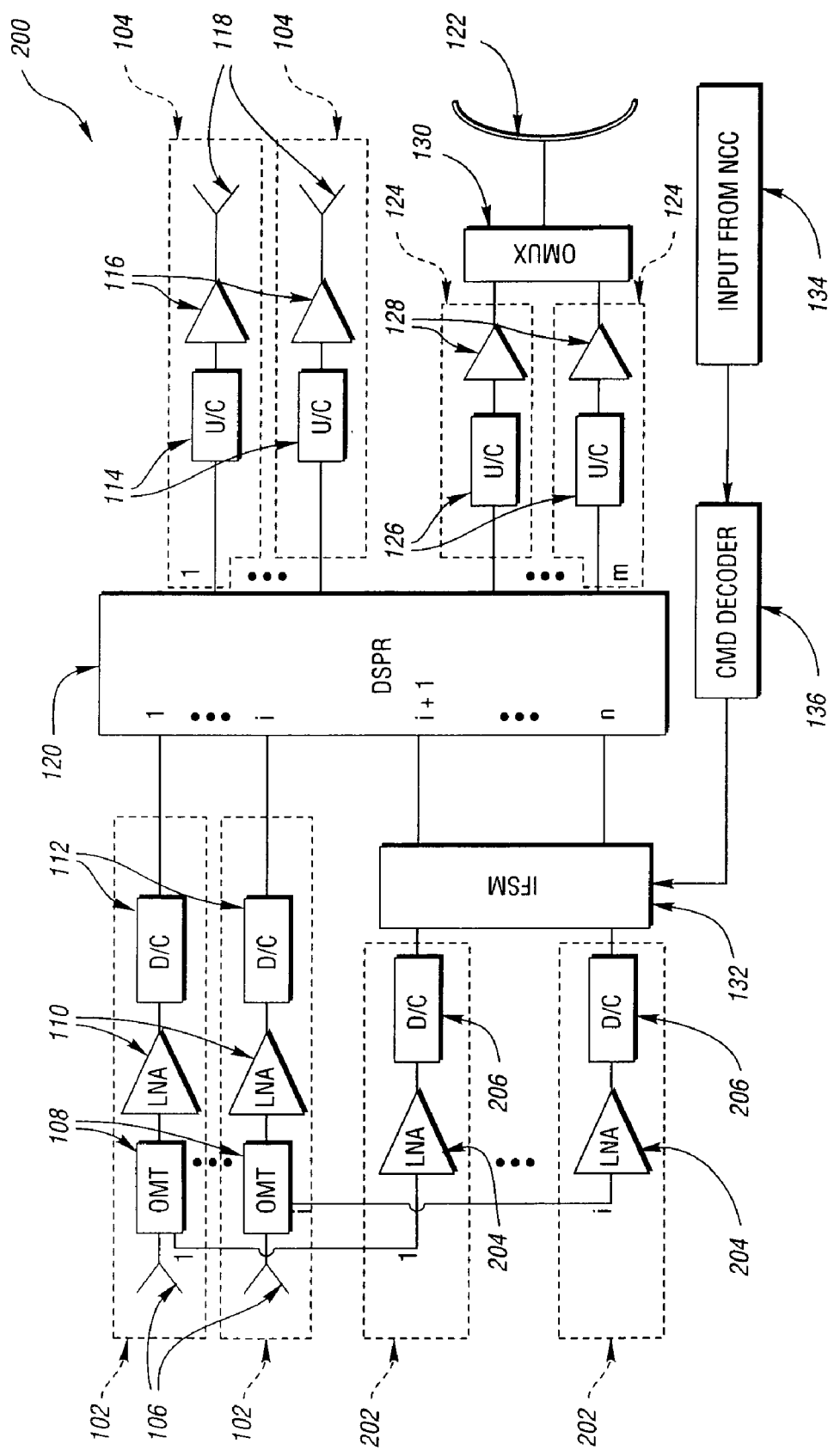
FIG. 3 shows a block diagram of a satellite payload in accordance with a second embodiment of the present invention.

FIG. 3 discloses a second embodiment 200 of the present invention where like elements to those previously described are denoted with the same reference numbers. System 200 is arranged to accommodate existing DSPR and satellite designs while at the same time provide broadcast transmission and surge handling capabilities, and improve system utilization and efficiency.

More specifically, system 200 is arranged to operate with a system frequency plan which allocates the full primary system spectrum of one polarization to uplink-downlink spot-beams for PTP transmissions, while the full primary spectrum of the opposite polarization is allocated for broadcast transmissions utilized with the broadcast downlink beam. In addition, the broadcast spectrum is assignable in minimum-resolution broadcast (MRB) bands, which are assignable to any and all uplink spot beams in any combination as configured by NCC 20.

Further, DSPR input/output ports are assumed to have a fixed amount of bandwidth processing capability equal to 1/K of the primary system spectrum on one polarization, where K is the number of MRBs fitting into the primary spectrum. Spot beams on the broadcast polarization will be received at the satellite by a plurality of receiver subsystems 202 having a bandwidth equal to the full primary spectrum. More specifically, each receiver subsystem 202 is connected to a corresponding OMT 108 in one of the receiver subsystems 102, and to an input of IFSM 132. Each receiver subsystem 202 includes a set of LNAs 204 and downconverters (D/C) 206 similar to LNAs 110 and D/Cs 112.

IFSM 132 is controlled by ground commands to select a fixed bandwidth equal to the DSPR input port capacity (i.e., 1/K of primary spectrum) that corresponds to each individual spot beam for PTP traffic, and connects each to a pre-assigned output port for input to a dedicated input port of DSPR 120. At the same time, IFSM 132 can be configured by NCC 20 to select any number of MRB frequency bands from each IF signal of each full-band receiver subsystem 202, and deliver each selected MRB band to one of several output ports. As such, the input and output ports of IFSM 132 and DSPR 120 are generally different in their bandwidth handling capability when used with PTP or broadcast receive/transmit subsystems.

With the embodiment shown in FIG. 3, the output broadcast ports of DSPR 120 as a set cannot support more bandwidth than the total spectrum allocated to the broadcast transmissions in the downlink. This means that the total number of MRB frequency bands selected from all of the received full-band IF signals from all spot beams at any instant cannot carry more user data packets than can be correspondingly carried in the set of broadcast TDM streams. Further, every spot beam can access the satellite broadcast section in increments of one MRB up to the full primary spectrum, if so configured by NCC 20, and can transmit on all or a portion of a MRB as needed. Thus, depending on the amount of surge capacity required by each spot, in either the uplink or downlink direction, the satellite payload can be configured to deliver the necessary additional capacity.

Therefore, the addition and integration of the broadcast downlink beam in accordance with the present invention overcomes the aforementioned shortcomings of conventional multi-spot-beam system designs. More specifically, the present invention provides a system which can support all broadcast applications/services at a significantly higher transmission efficiency than otherwise possible through the spot beams. This is achieved because by carrying broadcast services over the broadcast channels, more of the capacity of each spot beam is available for PTP traffic. In addition, the broadcast capacity, accessible to all system users in all spot beams, can be selectively used as a surge mechanism to provide additional uplink/downlink capacity to any spot beam for PTP traffic when the PTP capacity of a particular beam is fully exhausted. Thus, unpredictable changing market needs and traffic distribution can be met by assigning capacity to the right mix of services and locations throughout the system life cycle. Finally, having the surge and broadcast capacity to assign to different beams also optimizes the effective utilization of the total satellite capacity. In other words, use of the surge capacity to continue to keep in service an otherwise exhausted spot beam will inherently increase the utilization of every other spot beam, and thus that of the whole system.

While the best mode for carrying out the invention has been described in detail, those familiar with the art to which this invention relates will recognize various alternative designs and embodiments for practicing the invention as defined by the following claims.

What is claimed is:

1. A method for improving utilization of satellite capacity of a satellite system that uses multiple uplink spot beams and downlink spot beams, comprising: switching from operating one or more of the multiple spot beams of a satellite whose transmission capacity has been exhausted to operating area-wide broadcast downlink beam of the satellite for supporting point-to-point transmissions of the one or more of the multiple spot beams of the satellite whose transmission capacity has been exhausted.

2. A method as recited in claim 1, further comprising: allocating a full primary spectrum of one polarization to uplink and downlink spot beams for point-to-point transmissions, and allocating a full primary spectrum of a polarization opposite to the one polarization to the area-wide broadcast downlink beam for broadcast transmissions.

3. A method as recited in claim 2, further comprising: assigning the full primary spectrum for broadcast transmissions in minimum-resolution broadcast bands.

4. A method as recited in claim 3, wherein the minimum-resolution broadcast bands are assigned to any and all uplink spot beams in any combination as configured by a network control center.

5. A method as recited in claim 4, wherein each one of the multiple uplink and downlink spot beams can access the full primary spectrum for broadcast transmissions in increments of one minimum-resolution broadcast band and can transmit on at least a portion of at least one minimum-resolution broadcast band.

* * * * *